United States Patent
Burner et al.

(10) Patent No.: US 7,452,134 B2
(45) Date of Patent: Nov. 18, 2008

(54) BEARING ASSEMBLIES WITH SEALS

(75) Inventors: Bruce C. Burner, Alliance, OH (US);
Gerald P. Fox, Massillon, OH (US);
Michael D. Allega, Clinton, OH (US)

(73) Assignee: The Timken Company, Canton, OH (US)

( * ) Notice: Subject to any disclaimer, the term of this patent is extended or adjusted under 35 U.S.C. 154(b) by 454 days.

(21) Appl. No.: 10/577,195

(22) PCT Filed: Nov. 10, 2004

(86) PCT No.: PCT/US2004/038250
§ 371 (c)(1),
(2), (4) Date: Apr. 26, 2006

(87) PCT Pub. No.: WO2005/047720
PCT Pub. Date: May 26, 2005

(65) Prior Publication Data
US 2007/0133915 A1    Jun. 14, 2007

Related U.S. Application Data

(60) Provisional application No. 60/518,941, filed on Nov. 10, 2003.

(51) Int. Cl.
*F16C 33/76* (2006.01)
(52) U.S. Cl. ................................. 384/481; 384/477
(58) Field of Classification Search ................ 384/477, 384/478, 479, 481; 305/100, 136; 277/358, 277/380, 382, 392

See application file for complete search history.

(56) References Cited

U.S. PATENT DOCUMENTS 2,275,307 A    3/1942    Murden
(Continued)

FOREIGN PATENT DOCUMENTS

| EP | 0591123 A2 | 4/1994 |
| EP | 0591123 A3 | 4/1995 |
| FR | 2600741 | 12/1987 |
| FR | 0677673 A1 | 10/1995 |

OTHER PUBLICATIONS

Official Action from the European Patent Office regarding European Application No. 04811099.3, which is the counterpart of U.S. Appl. No. 10/577,195 and contains similar claims—mailing date: Jun. 17, 2008.

*Primary Examiner*—Thomas R Hannon
(74) *Attorney, Agent, or Firm*—Polster, Lieder, Woodruff & Lucchesi, L.C.

(57) ABSTRACT

A bearing assembly (A-H) enables one member (4) to rotate relative to another member (2) about an axis (X). It includes a bearing (6) having an inner race (54) on one of the members, an outer race (74, 126, 164, 250) in the other member, and rolling elements (58) between raceways on the two races. A seal (10, 180, 210, 256) excludes contaminants from the interior of the bearing, and it includes a wear ring (92, 184, 214, 276) carried by an extension (80, 128, 144, 168, 252) on the outer race beyond the raceway of that race, a contacting wear ring (90, 182, 212, 278) carried by the member on which the inner race is located or else by a can (110, 230, 254) that is fitted to the inner race. The seal also includes backing elements (94, 96, 192, 194, 216, 218, 294) for supporting the wear rings on that which carries them, and in most instances the backing elements exert a biasing force on the wear rings to maintain them in contact, so that they establish a dynamic fluid barrier. The backing elements may include O-rings (94, 96), polymer connecting segments (200) or springs (292) and a membrane (294).

20 Claims, 6 Drawing Sheets

U.S. PATENT DOCUMENTS

| | | |
|---|---|---|
| 2,647,025 A | 7/1953 | Deffenbaugh |
| 3,201,134 A | 8/1965 | Hayatian |
| 4,167,297 A | 9/1979 | Cheesman et al. |
| 4,351,533 A * | 9/1982 | Moore .................. 384/481 |
| 4,640,559 A * | 2/1987 | Crotti .................. 305/100 |
| 4,687,350 A * | 8/1987 | Vogt et al. ............ 384/481 |
| 4,881,829 A * | 11/1989 | Koelsch ................ 384/448 |
| 6,086,069 A | 7/2000 | Bedford et al. |

* cited by examiner

BEARING ASSEMBLIES WITH SEALS

RELATED APPLICAITON

This application derives and claims priority from International application PCT/US2004/038250 filed 10 Nov. 2004 (published under International Publication Number WO 2005/047720A1) and from U.S. provisional application 60/518,941 filed 10 Nov. 2003.

TECHNICAL FIELD

This invention relates to bearing assemblies with seals for protecting the bearings of such assemblies and to the seals themselves.

BACKGROUND ART

Some antifriction bearings operate in extremely hostile environments. Typical are the bearings for the final drives of some track-laying vehicles, such as bulldozers. The bearings for a final drive reside between two housings, an inner and an outer housing, the former of which is bolted firmly to the frame of the vehicle, whereas the latter rotates and has a sprocket bolted to it. The sprocket drives an endless track. A so-called "duo-cone" seal that is fitted to the two housings adjacent to the inboard bearing isolates the bearings from water and from dirt and debris that are picked up by the track.

The typical duo cone seal (FIG. 1) for a final drive has two steel wear rings that contact each other along wear surfaces that lie perpendicular to the axis of rotation. One wear ring is fitted to the fixed inner housing with an O-ring between it and the housing, while the other wear ring is fitted to the rotatable outer housing with another O-ring between it and the outer housing. The O-rings not only support and position the wear rings in their respective housings, but also urge the two wear rings together so that they remain in contact along their wear surfaces.

Being fitted to the two housings, the duo cone seals are themselves considerably larger than the bearings that are between the two housings. This renders them more susceptible to deflections in the housings—and by reason of the high torque and forces applied to the housings, they deflect, sometimes to the extent that the wear rings separate at their wear surfaces. In short, the seals fail. The deflection may also cause the O-rings to slip and experience excessive wear.

BEST MODES FOR CARRYING OUT THE INVENTION

Figure 1:
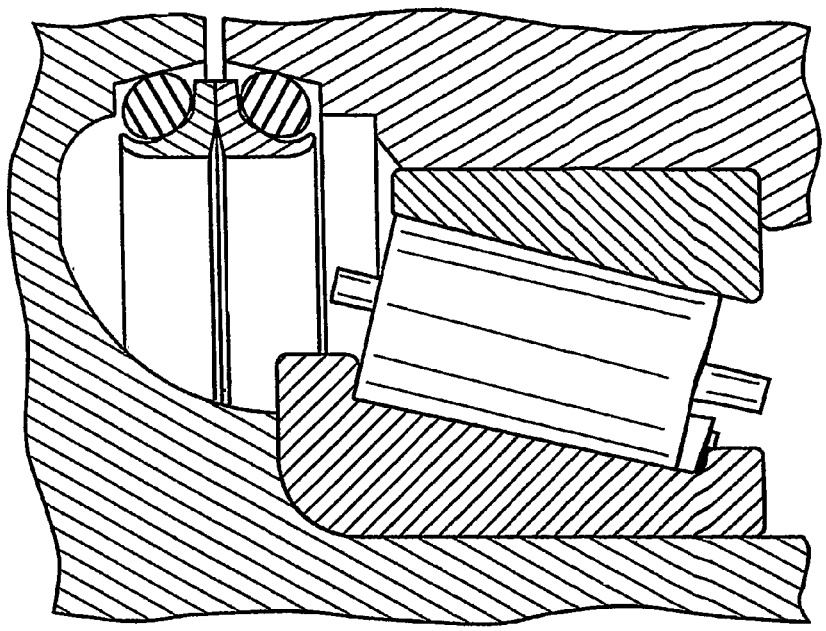
FIG. 1 is a sectional view of a bearing assembly, including its seal, of the prior art.

Referring now to the drawings a bearing assembly A (FIG. 2) that accommodates rotation about an axis X may form part of a final drive T for a track-laying vehicle. The assembly A basically includes a fixed inner member or housing 2, a rotatable outer member or housing 4 and two antifriction bearings 6 and 8, the former being in an inboard position and the latter in an outboard position. In addition, the assembly A includes a duo-cone seal 10 located at the inboard bearing 6 to protect both bearings 6 and 8 from contaminants that would otherwise migrate between the two housings 2 and 4 immediately outwardly from the inboard bearing 6. The two bearings 6 and 8 enable the rotatable housing 4 to revolve about the axis X with minimal friction.

Figure 2:
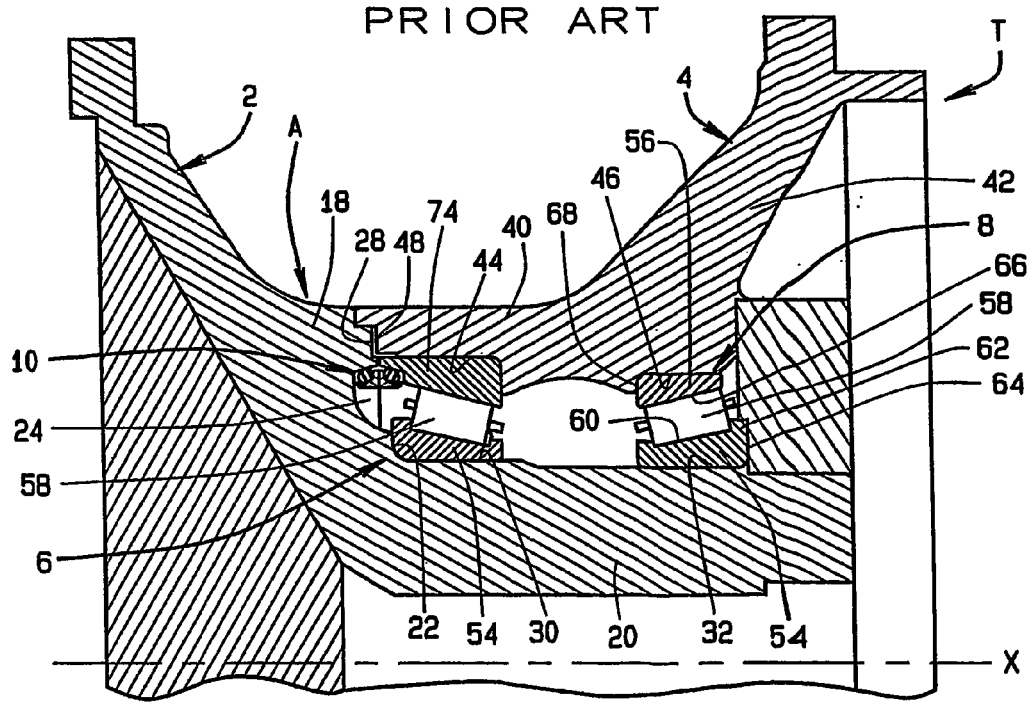
FIG. 2 is a longitudinal sectional view of a final drive containing a bearing assembly, including a seal, constructed in accordance with and embodying the present invention.
Figure 3:
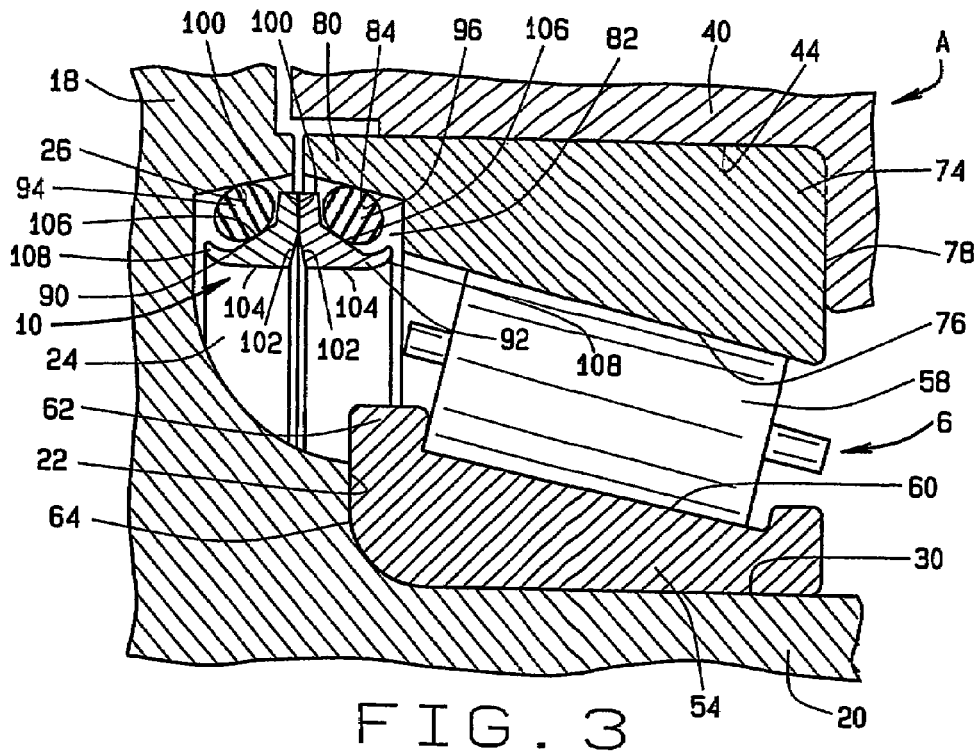
FIG. 3 is an enlarged sectional view of the bearing assembly and seal of FIG. 2.

The fixed housing 2 includes (FIG. 2) a flange 18 which lies generally oblique to the axis X, and a spindle 20 which projects axially from the flange 18, its centerline coinciding with the axis X. The flange 18 is bolted or otherwise attached firmly to a structural member of the vehicle, while the spindle 20 projects laterally away from that structural member. At the location where the spindle 20 emerges from the flange 18, the flange 18 is provided with (FIG. 3) a shoulder 22 and an annular cavity 24 immediately beyond the shoulder 22. The cavity 24 opens axially away from the flange 18 and into the interior of the rotatable housing 4 and at its periphery is defined by a tapered surface 26 that extends generally axially. The surface 26 tapers downwardly toward the back of the cavity 24 and is preferably conical with is centerline being the axis X. Its surface finish and manufacture provide it with standard duo-cone sealing and installation performance. Beyond the cavity 24 the flange 18 has a stepped surface 28 (FIG. 2). The spindle 20 has inboard and outboard bearing seats 30 and 32, the former being located adjacent to the shoulder 22 and the latter remote from it and nearer the opposite end of the spindle 20.

The rotatable housing 4 includes (FIG. 2) a hub 40 that surrounds the spindle 20 of the fixed housing 2 and a flange 42 which projects from the outboard end of the hub 40. The hub 40 contains two bearing seats—an inboard seat 44, which surrounds the inboard seat 30 on the spindle 20, and an outboard seat 46, which surrounds the outboard seat 32 on the spindle 20. At its inboard end the hub 40 has a stepped surface 48 which generally conforms to the stepped surface 28 on the flange 18 of the fixed housing 2. The two stepped surfaces 28 and 48 together form a labyrinth between the two housings 2 and 4 outwardly from the duo-cone seal 10.

The two bearings 6 and 8 take the form of single row tapered roller bearings mounted in opposition so that together they carry both radial loads and thrust loads in both axial directions. The outboard bearing 8 is conventional, while the inboard bearing may not be.

Considering the outboard bearing 8 first, it includes (FIG. 2) an inner race in the form of a cone 54, an outboard race in the form of a cup 56, and rolling elements in the form of tapered rollers 58 located between the cone 54 and the cup 56. The cone 54 has a tapered raceway 60 which is presented outwardly away from the axis X and a thrust rib 62 at the large end of the raceway 60. The thrust rib 62 leads out to a back face 64 that is squared off with respect to the axis X. The tapered rollers 58 lie in a single row between the two raceways 60 and 66 with their tapered side faces contacting the raceways 60 and 66 and their large end faces bearing against the thrust rib 62.

The cone 54 of the outboard bearing 8 fits over the outboard bearing seat 32 of the spindle 20 with an interference fit. The cup 56 of that bearing fits into the outboard bearing seat 46 of the hub 40, again with an interference fit, its back face 68 being against the shoulder at the end of the seat 46.

The inboard bearing 6 likewise has (FIG. 3) a cone 54 and tapered rollers 58 that do not differ from their counterparts in the outboard bearing 8 except in orientation. The cone 54 fits over the inboard bearing seat 30 on the spindle 20 with an interference fit, its back face 64 being against the shoulder 22 at the end of the spindle 20. The tapered rollers 58 of the inboard bearing 6 fit around the raceway 60 of the inboard cone 54, contacting that raceway along their tapered side faces and bearing against the thrust rib 62 and their large end faces. Completing the inboard bearing 6 is a cup 74 which differs from the standard cup 56 of the outboard bearing 8.

For one, the inboard cup 74 has (FIG. 2) a somewhat larger diameter than the outboard cup 56. Furthermore, it is somewhat wider. The inboard cup 74 (FIG. 3) has a tapered raceway 76 which is presented inwardly toward the axis X and a back face 78 at the small end of the raceway 76, with the back face 78 being squared off with respect to the axis X. Indeed, the cup 74 fits into the inboard bearing seat 44 in the hub 40 with an interference fit, its back face 78 being against a shoulder at the end of the seat 44 and its tapered raceway 76 being against the tapered side faces of the rollers 58. The raceway 76 at its large end leads out to a cup extension 80 that is formed integral with the cup 74.

The cup extension 80 projects axially from the cup 74 beyond the large end of the cup raceway 76 and toward the flange 18. It terminates close to the flange 18 immediately inwardly from the labyrinth formed by the stepped surfaces 28 and 48 (FIG. 2) and immediately outwardly from the cavity 24. The extension 80 contains an undercut 82 (FIG. 3) in the end of the cup 74, and that undercut 82 opens axially toward the cavity 24 in the flange 18 of the fixed housing 2. Its periphery is defined by a tapered surface 84 that extends generally axially and tapers downwardly toward the large end of the raceway 76. It aligns with the tapered surface 26 along the cavity 24 in the flange 18 and is preferably conical with its centerline being the axis X. Like the surface 26, the surface 84 is finished and otherwise manufactured to provide standard duo-cone sealing and installation performance.

The duo-cone seal 10 fits into the cavity 24 of the flange 18 and into the undercut 82 of the inboard cup 74 and is positioned by their respective tapered surfaces 26 and 84. The seal 10 includes (FIG. 3) metal wear rings 90 and 92 which bear against each other to establish a dynamic fluid barrier and backing elements in the form of O-rings 94 and 96 which serve to position the wear rings 90 and 92 and urge them together. Moreover, the O-ring 94 establishes a static fluid barrier between the wear ring 90 and the flange 18, whereas the O-ring 96 establishes a static fluid barrier between wear ring 92 and the cup extension 80.

Each wear ring 90 and 92 has a wear surface 100 that leads out to the periphery of the ring 90 or 92 and lies in a plane that is perpendicular to the axis X. Each also has a slight chamfer 102 that leads inwardly away from the wear surface 100 at a slightly oblique angle to the surface 100 and terminates at an inner surface 104 that is directed axially for essentially full width of the ring 90 or 92. The diameter of the inner surface 104 exceeds the greatest diameter of the conical envelope formed by the tapered rollers 58 of the inboard bearing 6, but not by much, perhaps on the order of 0.020 inch. This enables the seal 10 to pass over the rollers 58. Each wear ring 90 and 92 also has a rear surface 106 which is tapered, preferably conically. The surface 106 is finished and otherwise manufactured to provide standard duo-cone sealing and installation performance. The tapered rear surface 106 tapers downwardly away from the wear surface 100 and terminates at an outwardly turned retention lip 108. The rear surface 106 for the wear ring 90 is presented toward the contoured surface 26 along the cavity 24 of the flange 18, while the rear surface 106 for the wear ring 92 is presented toward the tapered surface 84 along the undercut 82 in the cup extension 80. The wear rings 90 and 92 are formed from a generally rigid substance that resists wear, preferably a metal such as hardened steel. Each is machined perfectly flat and perpendicular to the axis X along its wear surface 100.

The two O-rings 94 and 96 are formed from an elastomer in a toroidal configuration. The elastomer has a measure of resiliency. The O-ring 94 fits between the tapered rear surface 106 of the wear ring 90 and the tapered surface 26 along the cavity 24 in the flange 18 of the fixed housing 2 and thus serves to position the wear ring 90 in the cavity 24. The O-ring 96 fits between the tapered rear surface 106 of the wear ring 92 and the tapered surface 84 along the undercut 82 of the cup extension 80 and thus serves to position the wear ring 92 in the undercut 82. Indeed, the O-rings 94 and 96 are compressed between the surfaces that they separate and further bias the two wear rings 90 and 92 together at their wear surfaces 100.

To install the seal 10, the O-ring 94 is expanded over the retention lip 108 on the wear ring 90 and allowed to contract around the small end of the tapered rear surface 106 of the wear ring 90. Thereupon, the wear ring 90 is inserted into the cavity 24 in the fixed housing 2. The O-ring 90 around it contacts the tapered surface 26 of the housing 2 at the large end of that surface. Likewise, the O-ring 96 is expanded over the retention lip 108 of the other wear ring 92 and allowed to contract around the small end of the tapered surface 106 on the ring 92. Then the ring 92 is inserted into the undercut 82 in the cup extension 80 for the cup 74 of the inboard bearing 6. Its O-ring 96 comes against the tapered surface 84 at the large end of that surface. With the two wear rings 90 and 92 in place in the cavity 24 and undercut 82, respectively, and with the cone 54 and its complement of rollers 58 around the spindle of the fixed housing 2, and with the cup 74 in the rotatable housing 4, the two housings 2 and 4 are brought together such that the wear rings 90 and 92 contact each other at their wear surfaces 100. Indeed, the two housings 2 and 4 are forced together, and this drives the wear ring 90 farther into the cavity 24 and the wear ring 92 farther into the undercut 82. As the wear ring 90 moves into the cavity 24, its O-ring 94 frictionally engages and rolls up the tapered surface 106 on the wear ring 90 and down the tapered surface 26 that forms the periphery of the cavity 24. Moreover, the O-ring 94 compresses between the two tapered surfaces 26 and 106. Likewise, as the wear ring 92 moves into the undercut 82, its O-ring 96 rolls up the tapered surface 106 on the wear ring 92 and down the tapered surface 84 along the periphery of the undercut 82. It also compresses between the two tapered surfaces 84 and 106. While the two O-rings 94 and 96 undergo twisting as a consequence of rolling along the tapered surfaces between which they are confined, they retain their toroidal configuration. Even so, they seek to unwind, and as a consequence, the two O-rings 94 and 96 urge their respective wear rings 90 and 92 toward each other, so that the wear rings 90 and 92 remain in contact at their wear surfaces 100 and preserve the dynamic fluid barrier at those surfaces 100. In this regard, the tapered surfaces 26, 84 and 106 should be rough enough to enable the O-rings 94 and 96 to frictionally grip them and roll along them without slipping, so as to provide for seal installation and biasing. Yet the surfaces 26, 84 and 106 should be smooth enough to enable the O-rings 94 and 96 to establish static fluid barriers along them.

In the operation of the final drive A, the rotatable 4 housing revolves about the spindle 20 of the fixed housing 2 on the bearings 6 and 8. They transfer radial loads from the rotatable housing 4 to the fixed housing 2 and thrust loads as well, while minimizing resistance to rotation. The duo-cone seal 10 prevents contaminants, that may migrate through the labyrinth formed by the mating stepped surfaces 28 and 48, from entering the bearings 6 and 8.

To this end, the O-ring 94 establishes a static barrier between the flange 18 of the fixed housing 2 and the wear ring 90, while the O-ring 96 establishes a static barrier between the cup extension 80 on the inboard cup 74 and the wear ring 92. The two wear rings 90 and 92 effect a dynamic fluid barrier at their contacting wear surfaces 100. The static and dynamic barriers isolate the bearings 6 and 8 from the contaminants.

The bearings 6 and 8 operate with a lubricant and the bearing 6 inherently pumps some of the lubricant into the cavity 24 in the flange 18 of the fixed housing 2. This provides a reservoir of lubricant for reducing friction between the wear rings 90 and 92, in that some of the lubricant enters the converging chamber formed by the opposed chamfers 102 on the wear rings 90 and 92 and from there works its way onto the wear surfaces 100, thereby providing a lubricant film that reduces friction along the wear surfaces 100.

Loads imparted to the rotatable housing 4 deflect that housing somewhat and deflect the spindle 20 even more. The elastomeric O-rings 94 and 96 compensate for this deflection, urging the wear rings 90 and 92 together for the full areas of the wear surfaces 100, so the dynamic fluid barrier remains intact. This barrier, being generally at the diameter of the inboard cup 74, is more easily maintained than were it at a greater diameter as with conventional duo-cone seals. In other words, the dynamic barrier is brought into a diameter where flexures of the housings 2 and 4 impart less displacement to the seal 10. Moreover, the wear ring 92 and O-ring 96 follow deflections of the bearing 6, not the greater deflections of the housing 4.

Figure 4:
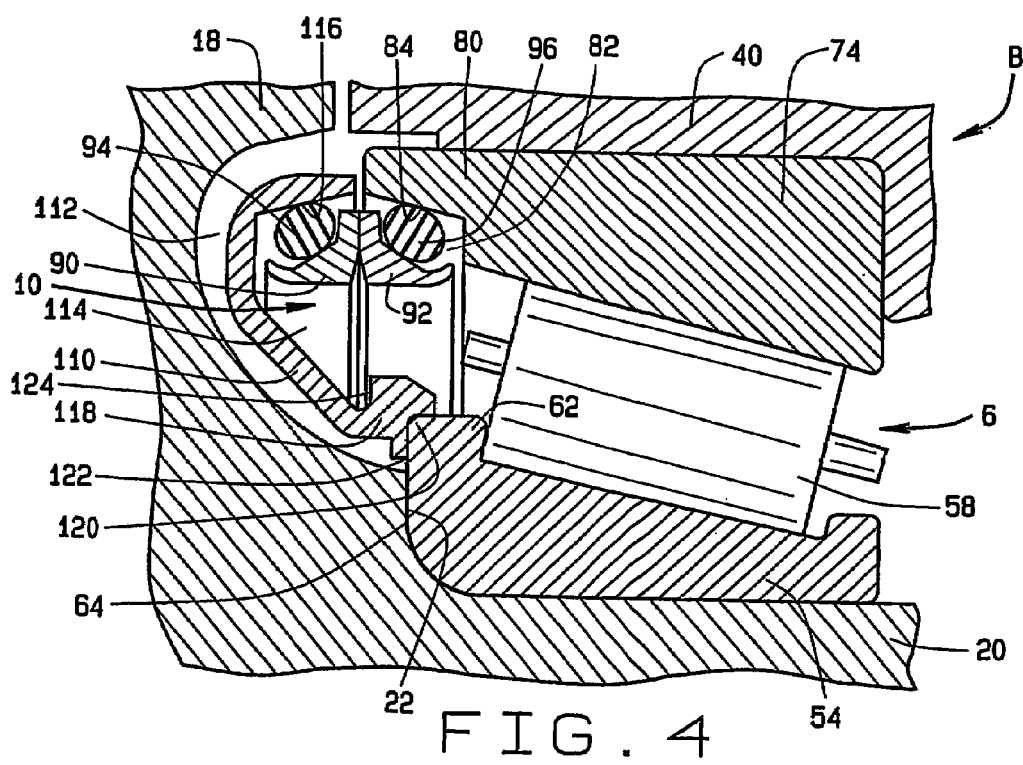
FIGS. 4-7 are enlarged sectional views of modified bearing assemblies and seals.

A modified assembly B (FIG. 4) confines deflections that its seal 10 experiences to the bearing 6 even more so than the assembly A. The assembly B has an inboard bearing 6. The cup 74 of the bearing 6, at its cup extension 80 retains the O-ring 96 and wear ring 92 for the duo-cone seal 10. The O-ring 94 and wear ring 90 forming the remainder of the duo-cone seal 10 are carried by a cone can 110 which in turn is carried by the cone 54 of the bearing 6.

In this regard, the flange 18 of the fixed housing 2 contains a cavity 112 which is large enough to receive the cone can 110, and the cone can 110 itself contains a cavity 114 which corresponds to the cavity 24 in the assembly A. As such, the cone can 110 defines a tapered surface 116 which lies along the periphery of the cavity 114 and generally aligns with the tapered surface 84 along the undercut 82 of cup extension 80. It corresponds to the tapered surface 26 along the cavity 24 in the flange 18 of the assembly A. Along its inner margin the cone can 110 has an enlarged base 118 that is provided with a rabbet 120 that receives the endmost edge of the thrust rib 62 for the cone 54. As such, the base 118 of the cone can 110 lies along both the outer cylindrical surface of the thrust rib 62 and along the back face 64 as well. The cone can 110 is attached to the cone 54 along a continuous weld 122 that penetrates the base 118 and the back face 64 of the cone 54. The cavity 114 extends into the base 118 and there provides a lip 124 that may be engaged by a tool for stripping both the cone can 110 and cone 54 from the spindle 20 of the housing 2.

The assembly B operates much the same as the assembly A. However, the O-ring 94 and wear ring 90, being received in the cone can 110, which is in turn carried by the cone 54 of the bearing 6, experience less displacement with respect to the O-ring 96 and wear ring 92 of the assembly A. Indeed, any relative displacement between the wear rings 90 and 92 is isolated to displacement within the bearing 6 itself, and that is of little magnitude.

Figure 5:
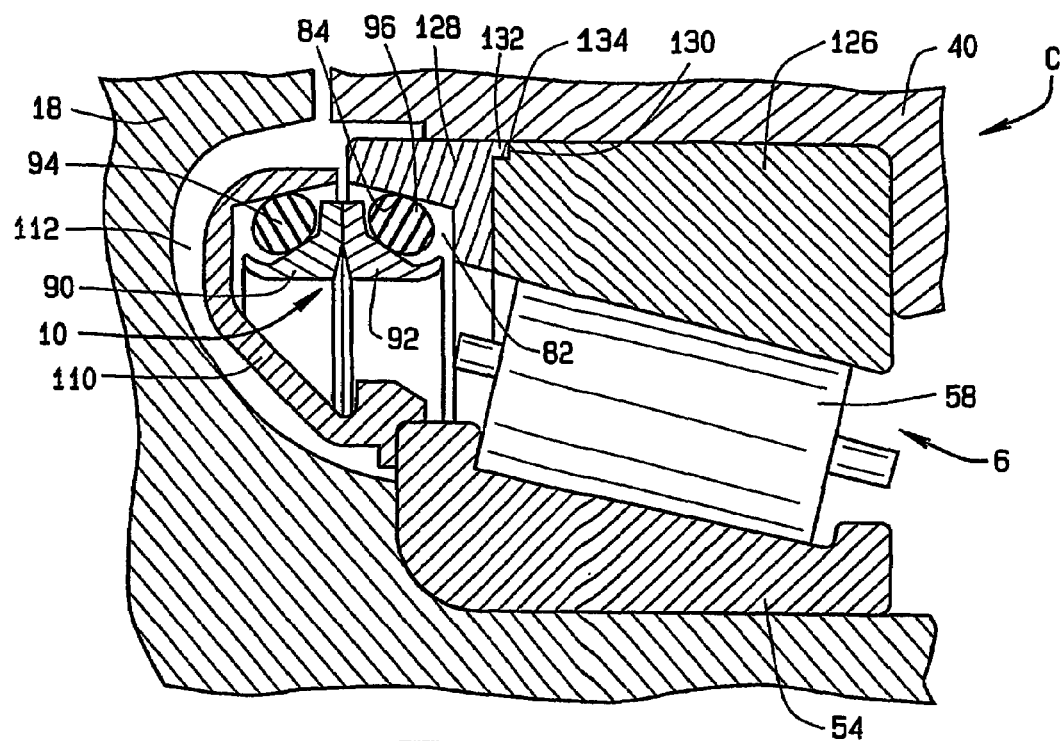

Another modified bearing assembly C (FIG. 5) is similar to the bearing assembly B in every respect, except that, its bearing 6 has a cup 126 that differs slightly from the cup 74 in the bearing 6 of the assembly A. While the cup 126 in configuration generally corresponds to a conventional cup, such as the cup 56 of the bearing 8, it carries an extension 128 which is formed as a separate component. The extension 128 contains the undercut 82 and the tapered surface 84 along the undercut 82. The cup 126 and extension 128 abut, and where they abut, the cup 126 is provided with a rabbet 130. The cup extension 128 has a rib 132 which projects into the rabbet 130. Here the extension 128 is joined to the cup 126 along a continuous weld 134. The cup 126 should be formed from bearing steel, but the extension 128 may be formed from a less expensive steel. The cup 126, although the same diameter as the cup 74, is easier and less expensive to manufacture.

Figure 6:
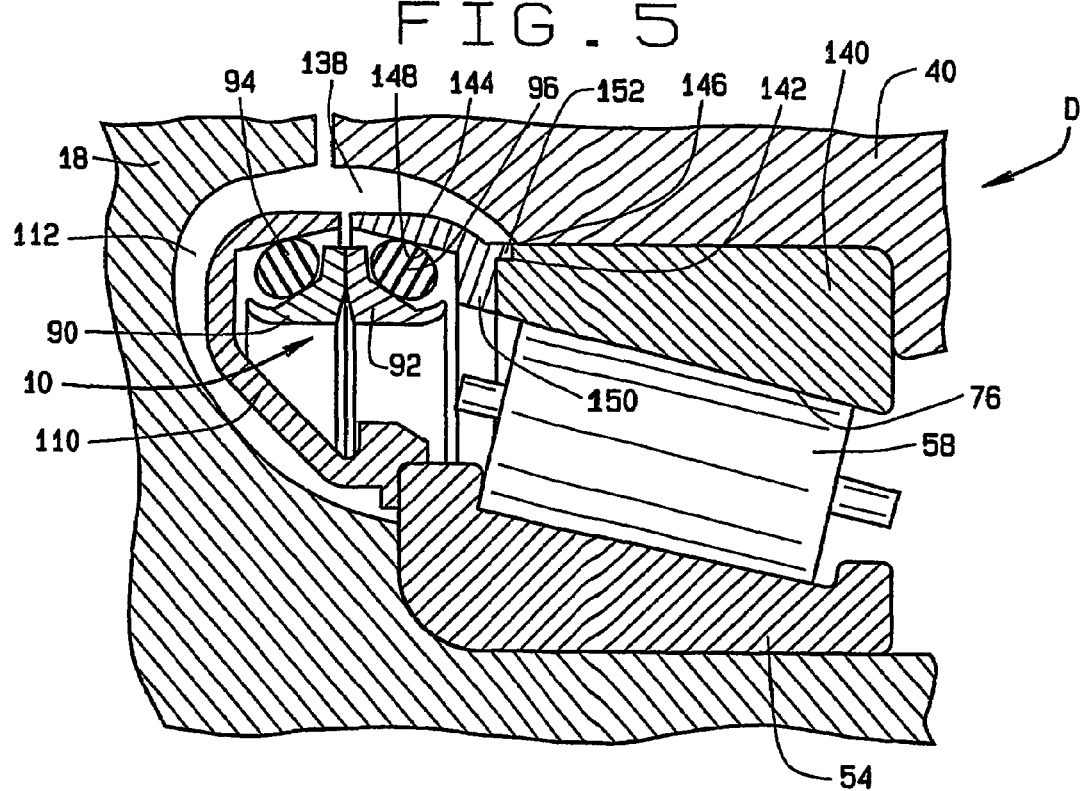

Still another modified bearing assembly D (FIG. 6) resembles the bearing assembly C in that its cone 54 is fitted with a cone can 110 that holds the wear ring 90 and its O-ring 94, the cone can 110 being in a cavity 112 in the fixed housing 2. The rotatable housing 4 has an opposed cavity 138. The inboard bearing 6 has a cup 140 that resembles a conventional cup, such as the cup 56, and is thus of lesser diameter then the cup 126 of the assembly C. However, the cup 140 possesses a rabbet 142 at the end out of which the large end of the raceway 76 opens.

In addition, the bearing assembly D has a cup extension 144 which is formed as a separate metal component, yet is joined to the cup 140 along a weld 146. In this regard, the cup extension 144 flares outwardly somewhat into the cavity 138, and the outwardly curved segment contains a tapered surface 148 along which the O-ring 96 for the wear ring 92 is disposed. The tapered surface 148 corresponds to the tapered surface 84 in the cup extension 80 of the assembly A. At its opposite end the cup extension 144 has an enlarged base 150 containing a rib 152 that fits within the rabbet 142 of the cup 140, allowing the remainder of the base 150 to bear against the adjoining end face of the cup 140. The weld 146, which is continuous, extends along the margin of the rabbet 142, where it bridges the cup 140 and the base 150 of the cup extension 144.

Figure 7:
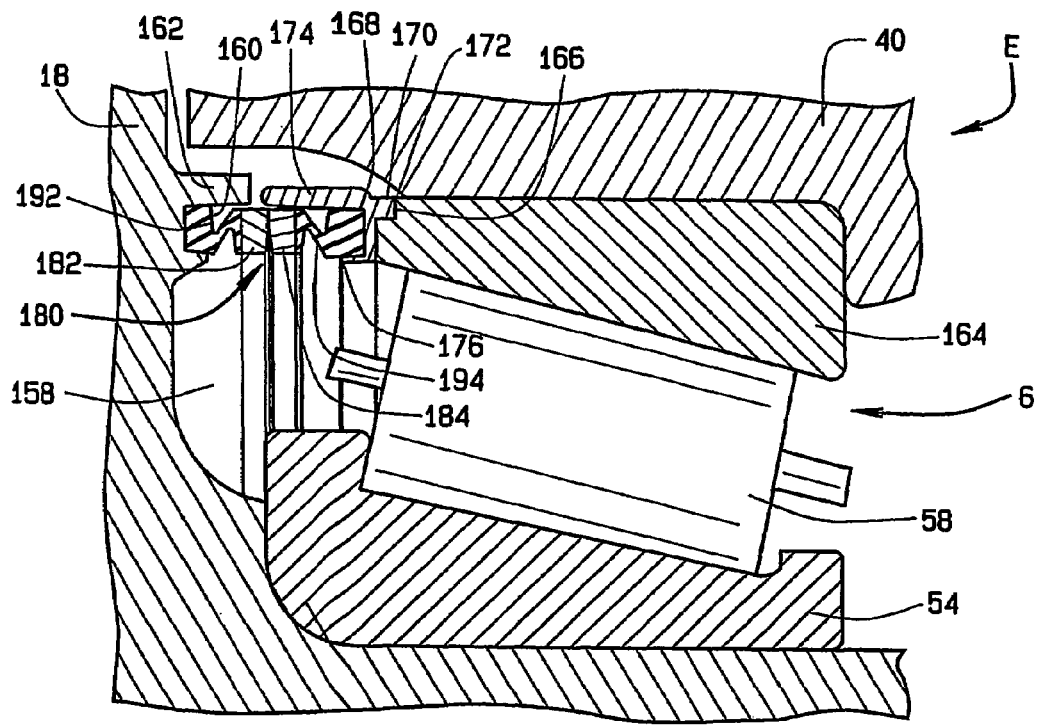

In yet another modified bearing assembly E (FIG. 7), the flange 18 of the fixed housing 2 contains an annular cavity 158 that opens toward the interior of the bearing 6 and an annular groove 160 that opens axially in the same direction beneath an axially directed rib 162, its inner and outer walls diverging slightly toward the open end. The inboard bearing 6, on the other hand, has a cup 164 that is essentially conventional, save for a rabbet 166 at its front face. The cup 164 carries a cup extension 168 that is formed from metal and has a positioning rib 170 which projects into the rabbet 166 in the cup 164 to position the extension 168 concentrically with respect to the cup 164 against the front face of the cup 164. Here the cup extension 168 is attached to the cup 164 along a continuous weld 172. The cup extension 168 also has a protective lip 174 which projects axially away from the cup 164 and toward the axially directed rib 162 on the flange 18 of the housing 2. Indeed, the rib 162 and lip 174 generally align. Beneath the protective lip 174 the cup extension 168 contains an annular groove 176 having inner and outer walls that diverge to the open end of the groove 176. The groove 176 aligns with and is the same size and configuration as the groove 160 in the flange 18.

Figure 8:
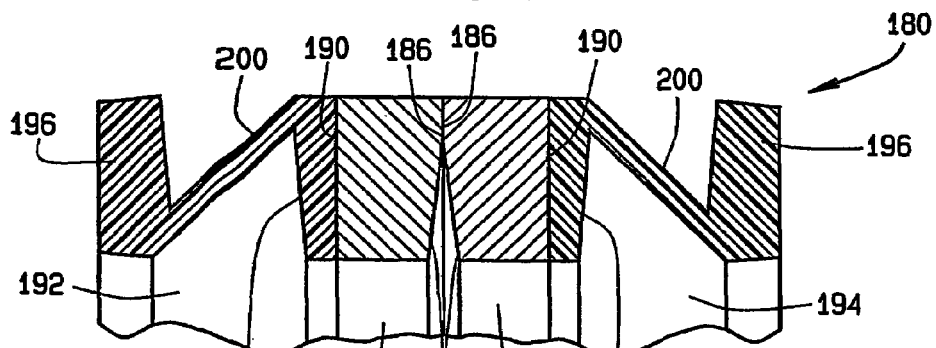
FIG. 8 is a fragmentary sectional view of the seal for the bearing assembly of FIG. 7.

The space between the flange 18 of the housing 2 and the cone extension 168 on the cup 164 of the bearing 6 is closed by a seal 180 which resembles the duo-cone seal 10 in the sense that it has (FIG. 8) two wear rings 182 and 184 that bear against each other along wear surfaces 186, and have chamfers 188 leading up to the wear surfaces 186 so that a lubricant will migrate toward the wear surfaces 186. In contrast to the wear rings 90 and 92 of the duo-cone seal 10, each wear ring 182 and 184 has a rear face 190 that is generally squared off with respect to the axis X, with the rear face 190 on the ring 182 being presented toward the groove 160 in the flange 18 and the rear face 190 on the ring 184 being presented toward the groove 176 in the cup extension 168.

In addition, the seal 180 has backing elements 192 and 194 which position the wear rings 182 and 184 and urge them together. Each backing element 192 and 194 is molded from a resilient polymer, such as polyurethane, and includes (FIG. 8) an annular base 196 that is wedge shaped in cross section, an annular floating segment 198 spaced from the base 196, and an inclined—or more accurately, a conical—connecting segment 200 which extends diagonally between the base 196 and floating element 198, it being joined to the former at a diameter less than that at which it is joined to the latter. The connecting segment 200, owing to its configuration and the resiliency of the material from which the backing element 192 or 194 is formed, serves as a spring, enabling the floating segment 198 to move axially toward and away from the base 196. When the floating segment 198 is displaced toward the base 196, the connecting segment 200 urges or biases it away from the base 196. Moreover, the restoring or biasing force is generally uniform, that is to say, it remains generally constant over large deflections. The base 196 and floating segment 198 may be separated by connecting segments of other configuration, including ones having multiple convolutions instead of the single convolution of the connecting segment 200. The base 196 is wedge shaped in cross section, corresponding to the cross-sectional configuration of the annular grooves 160 and 176. Indeed, the bases 196 of the two backing elements 192 and 194 will fit into the grooves 160 and 176, respectively, and will remain, all without any bonding. The "push-in" assembly renders the seal 180 considerably less difficult to install than duo-cone seals.

The base 196 of the backing element 192 fits into the annular groove 160 of the flange 18. The floating segment 198 of the backing element 192 is bonded firmly to the rear face 190 of the wear ring 182. Thus, the backing element 192 supports the wear ring 182 on the housing 2, yet enables the wear ring 182 to be displaced under a bias toward the flange 18 of the housing 2.

The base 196 of the other backing element 194 fits firmly into the groove 176 of the cup extension 168 and lies within the confines of the protective lip 174. The floating segment 198 of the backing element 194 is bonded firmly to the rear face 190 of the wear ring 184. The backing element 194 supports the wear ring 184 on the cup extension 168 and enables the wear ring 184 to be displaced axially under a bias toward the cup 164.

Indeed, the size of the two backing elements 192 and 194 is such that their floating segments 198 are displaced slightly, with the displacement being accommodated by the connecting segments 200. As a consequence, the two wear rings 182 and 184 are urged together at their wear surfaces 186, establishing a dynamic fluid barrier.

Being in part carried by the cup 164, the seal 180 is not affected by deflection in the rotatable housing 4, that is to say, seal deflection is minimized.

Figure 9:
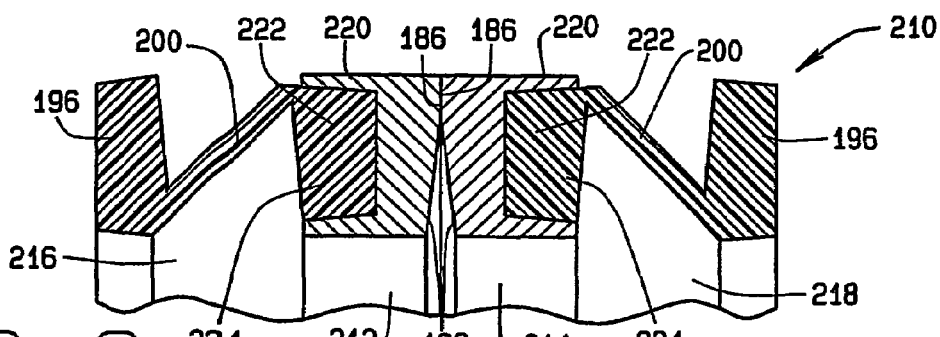
FIG. 9 is a fragmentary sectional view of a modified seal.

A modified seal 210 (FIG. 9) may be substituted for the seal 180 in the bearing assembly E. The seal 210 has wear rings 212 and 214 and backing elements 216 and 218 which resemble their counterparts in the seal 180. To this end, the wear rings 212 and 214 have wear surfaces 186 and chamfers 188 as do the wear rings 182 and 184. In addition, each has flanges 220 that define a groove 222 having slightly tapered side faces that diverge, thus, making the groove 222 wedge shaped. Each backing element 216 and 218 has a base 196 and a connecting segment 200 which resemble their counterparts on the backing elements 192 and 194 of the seal 180. However, each backing element 216 and 218 has a floating segment 224, to which its connecting segment 200 is connected, and that floating segment 224 is somewhat larger than the floating segment 198 in the seal 180. The floating segments 224 for the two backing elements 216 and 218 possess wedge-shaped configurations that correspond to the configurations of the rearward opening grooves 222 of the wear rings 212 and 214. Indeed, the floating segments 224 fit snugly in the grooves 222. This facilitates installation, in that push-in assembly is employed at floating segments 224.

Figure 10:
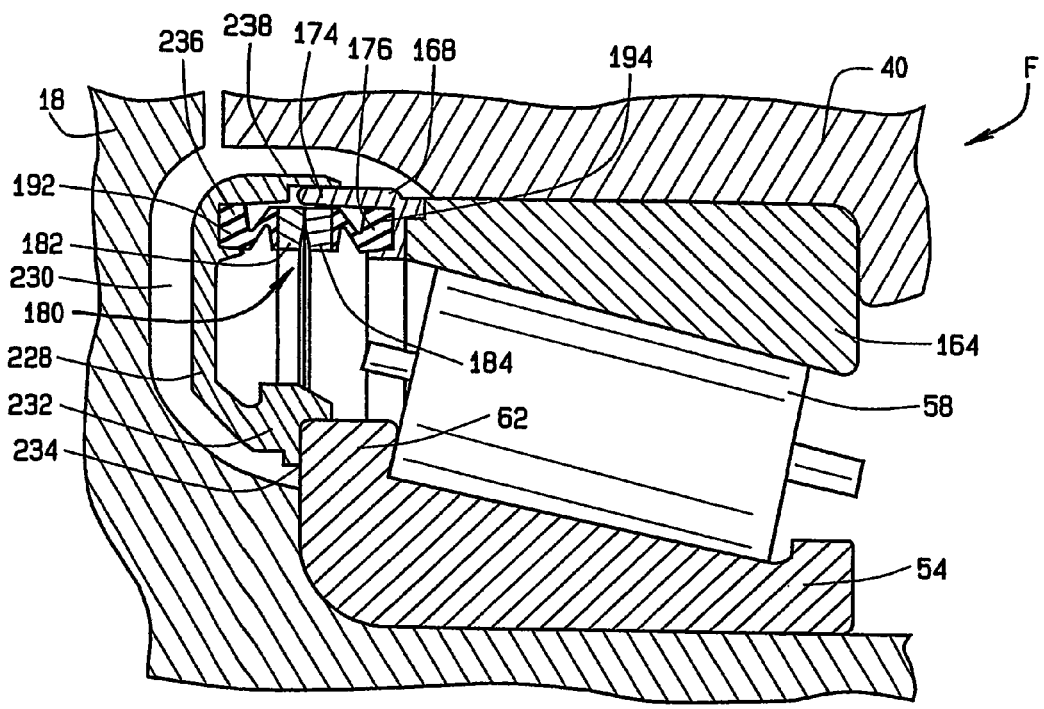
FIG. 10-12 are enlarged sectional views of more modified bearing assemblies and seals.

A modified bearing assembly F (FIG. 10) in one sense resembles the bearing assembly B or D in that it includes a cone can 228 and in another sense resembles the bearing assembly E in that it utilizes the seal 180.

The cone can 228 lies generally within a cavity 230 of the flange 18 and includes an enlarged base 232 which fits over the thrust rib 62 on the cone 54 of the bearing 6 and is secured to the cone 54 with a lap weld 234. The cone can 228 has a wedge-shaped groove 236 which opens toward the groove 176 in the cup extension 168. Beyond the groove 236 the cone can 228 has an axially directed lip 238 that overlies the protective lip 174 on the cup extension 168, thus establishing a labyrinth between the cone can 228 and cup extension 168.

The cone can 228 isolates the wear ring 182 for the seal 180 from flexures of the fixed housing 2. Thus, any distortion that may affect the seal 180 are those in the bearing 6 itself.

The modified seal 210 may be substituted for the seal 180 in the bearing assembly F.

Figure 11:
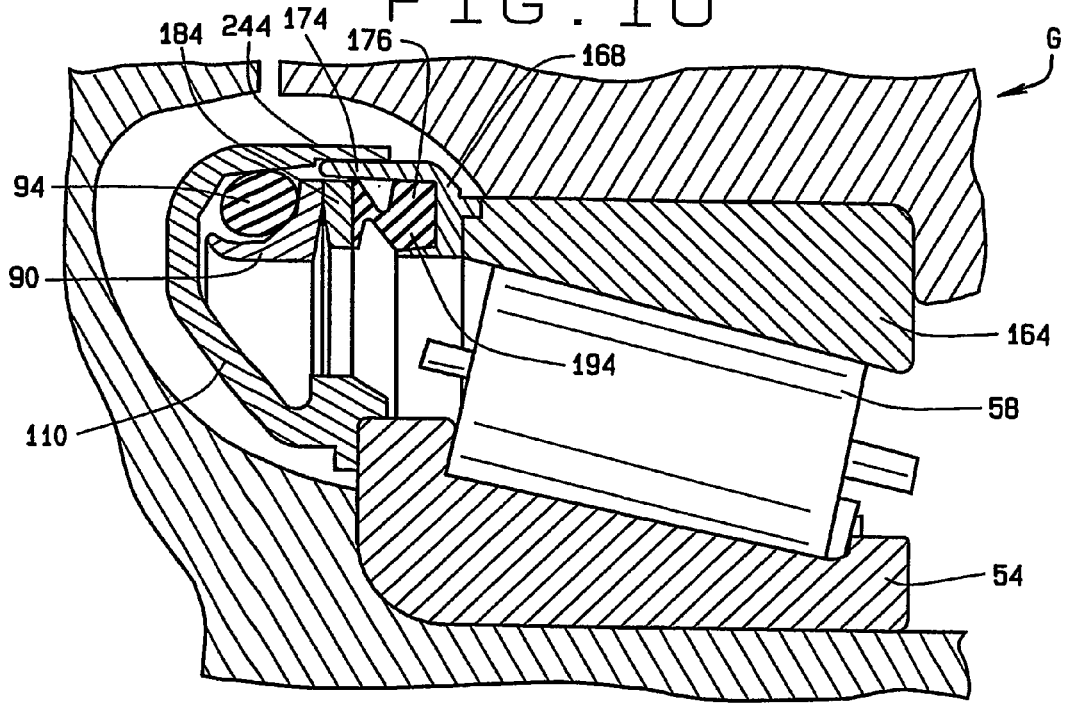

Still another modified bearing assembly G (FIG. 11) is a hybrid of sorts, inasmuch as it includes components from both the bearing assembly B and the bearing assembly E. In this regard, the bearing assembly G in its bearing 6 utilizes the cup 164 of the bearing assembly E as well as the cup extension 168 and the wear ring 184 and backing element 194 which are carried by the cup extension 168. The cone 54 of the bearing assembly G is fitted with the cone can 110 of the bearing assembly B modified to provide a lip 244 that overlies the protective lip 174 of the cone extension 168 to create a labyrinth. The cone can 110 contains the wear ring 90 and O-ring 94 of the seal 10. Thus, the two rings 90 and 184 bear against each other along their wear surfaces 100 and 186 and establish a dynamic fluid barrier.

The arrangement may be reversed so that the cone 54 is fitted with the cone can 228 which in turn carries the wear ring 182 and backing element 192, whereas the bearing 6 has the cup 140 provided with a cup extension 144 that contains the wear ring 92 and O-ring 96 as in the assembly D.

Figure 12:
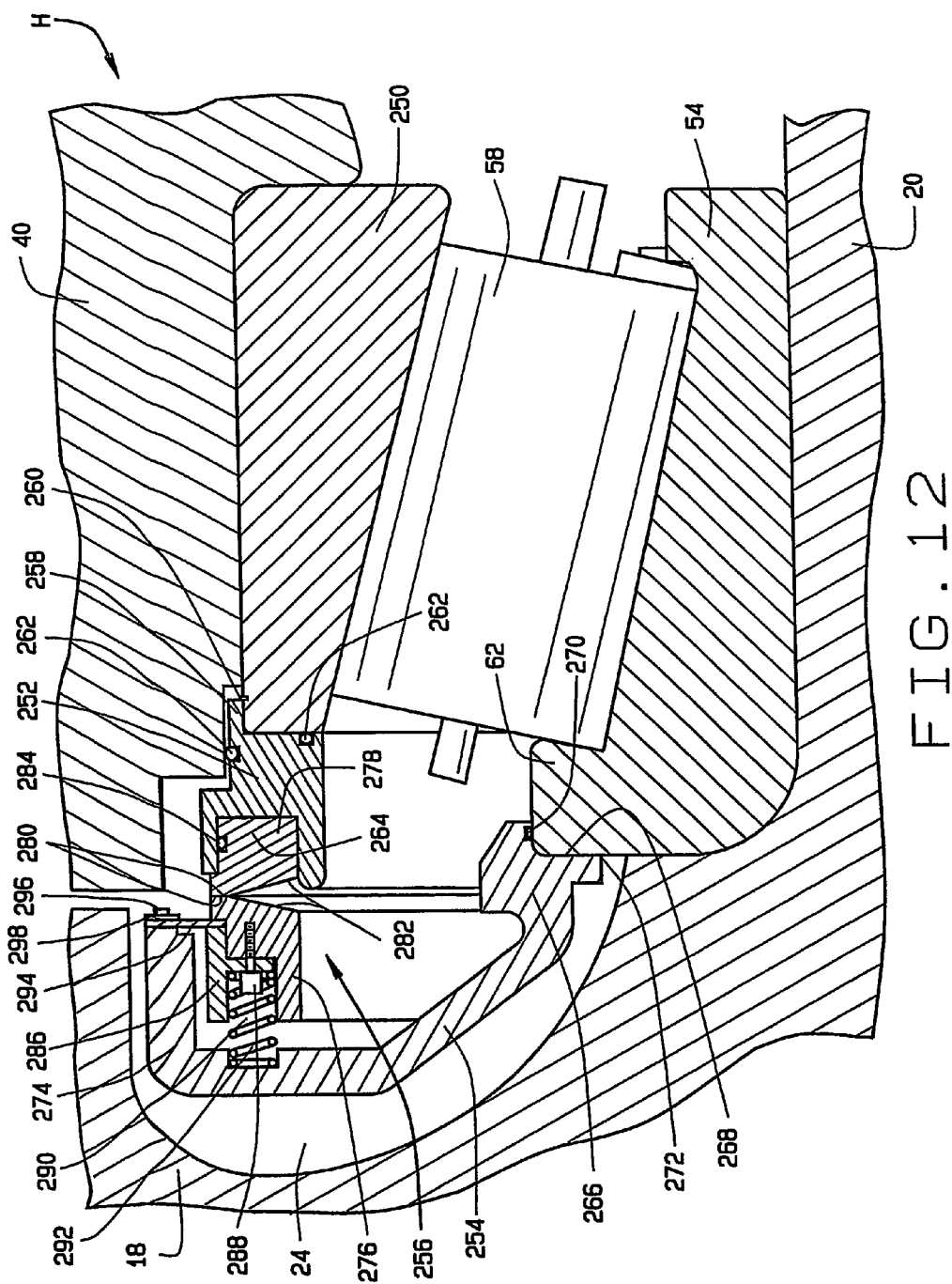

Yet another modified bearing assembly H (FIG. 12) likewise utilizes the bearing 6 between the rotatable housing 2 and 4. The bearing 6 has a conventional cup 250 which is fitted with a cup extension 252. The cone 54, on the other hand, is fitted with a cone can 254, and between the cup extension 252 and the cone can 254 is a seal 256 which establishes static and dynamic fluid barriers that exclude the ingress of contaminants and thus isolates the interior of the bearing 6.

The cup extension 252 fits against the front face of the cup 250 and is provided with a lip 258 that overlies the exterior surface of the cup 250 and serves to position the cup extension 252 concentrically on the cup 250. Here the cup extension 252 is joined to the cup 250 along a weld 260. The cup extension 252 carries O-ring seals 262 that establish static fluid barriers between it and the rotatable housing 4 and between it and the end face of the cup 250. The O-ring seal 262 at the end face of the cup 250 enables the weld 260 to be interrupted, and this in turn reduces the amount of heat applied to the cup 250 during welding. In addition, the cup extension 252 has an annular groove 264 which opens axially away from the cup 250.

The cone can 254 lies within the cavity 24 of the fixed housing 2 and includes a base 266 provided with a rabbet 268 that receives the outer edge of the thrust rib 62 for the cone 54 and thus serves to position the cone can 254 on the cone 54. The base 266 carries an O-ring seal 270 that establishes a static fluid barrier between the cone can 254 and the cone 54. The cone can 254, like the cone cans 110 of the assemblies B, C, D, F and G, has a lip that a tool may engage to strip the cone can 110 and cone 54 from the spindle 20.

The cone can 254 is attached firmly to the cone 54 with a weld 272 that penetrates its base 266 and the thrust rib 62 of the cone 54. The weld 266, owing to the presence of the O-ring 270, may also be interrupted, that is noncontinuous. Along its periphery the cone can 254 has a axially directed segment 274 which projects toward the rotatable housing 4 at a diameter greater than that of the cup extension 252.

The seal 256 includes wear rings 276 and 278, each, like the wear rings 90 and 92, being provided with wear surfaces 280 and chamfers 282. The two wear rings 276 and 278 bear against each other at their wear surfaces 280, while the chamfers 282 allow lubricant to reach the wear surfaces 280. The wear ring 278 fits snugly into the annular groove 264 of the cup extension 252 and carries an O-ring seal 284 to establish a static fluid barrier between it and the cup extension 252.

In addition to the two wear rings 276 and 278, the seal 256 includes a floating carrier ring 286 to which the wear ring 276 is attached with machine screws 288 which pass through the carrier ring 286 and thread into the wear ring 276. The carrier ring 286 together with the wear ring 276 form a groove 290 which opens axially toward the cone can 254. The groove 290 receives several coil-type compression springs 292 which are arranged at equal circumferential intervals and bear against the cone can 254. The springs 292 exist in a state of compression and urge the wear ring 276 toward the wear ring 278, maintaining the two wear rings 276 and 278 in contact along their wear surfaces 280. Stacked Belleville or wave springs may be substituted for the coil-type compression springs 292.

Finally, the seal 256 includes an annular membrane 294 which spans the space between the axially directed segment 274 of the cone can 254 and the floating carrier ring 286 and serves not only to position the wear ring 276 concentrically with respect to the wear ring 278, but also serves to effect a fluid barrier between the cone can 254 and the floating carrier ring 286. It is, in effect, a backing element, which further assists the springs 292 in maintaining the two wear rings 276 and 278 in contact at their wear surfaces 280, yet in an angularly and axially compliant manner.

The membrane 294, which is formed from a polymer or an polymer-impregnated fabric mesh, is stretched tightly between the carrier ring 286 and the axial segment 274 of the cone can 254 and thus exists in state of radial tension. The machine screws 288 when turned down, pinch the membrane 294, along its inner margin, between the carrier ring 286 and the wear ring 276. Along its outer margin the membrane 294 is clamped firmly against the end of the axial segment 274 of the cone can 254 with machine screws 296. Actually, the machine screws 296 bear against a clamp ring 298 which in turn bears against the membrane 294.

The several bearing assemblies A-G need not be confined to the final drives of tracked vehicles, but may be utilized wherever one member rotates relative to another member. Moreover, the housing 2 may rotate and the housing 4 may remain fixed or both housings 2 and 4 may rotate at different angular velocities. Also, the bearings 6 and 8 need not be tapered roller bearings, but can be other types of antifriction bearings, such as cylindrical roller bearings or spherical roller bearings or even angular contact ball bearings. Furthermore, the weld 122 of the bearing assembly B, the weld 134 of the bearing assembly C, the weld 146 of the bearing assembly D, the weld 172 of the bearing assembly E, and the weld 234 of the bearing assembly F, may all be interrupted welds to avoid overheating the case hardened steel which they penetrate. To prevent contaminants from seeping past the interrupted welds 122, 134, 146, and 234, O-ring seals may be employed as in the bearing assembly H.

The invention claimed is:

1. A bearing assembly for facilitating rotation about an axis, said bearing assembly comprising:
    an inner race having a raceway that is presented outwardly away from the axis;
    an outer race having a raceway that is presented inwardly toward the axis and toward the raceway on the inner race;
    rolling elements located between and contacting the inner and outer raceways;
    an extension joined to the outer race and projecting axially beyond the raceway of the outer race;
    a first wear ring carried by the extension on the outer race axially beyond the raceway of the outer race and having a wear surface located at a steep angle with respect to the axis;
    a second wear ring having a wear surface located at a steep angle with respect to the axis and contacting the wear surface of the first wear ring; and
    at least one backing element supporting one of the wear rings and urging it toward the other wear ring, so that the wear rings are biased together and establish a dynamic fluid barrier at their wear surfaces;
    the wear rings being slightly larger than the envelope formed by the rolling elements around the inner race so that in the absence of the outer race the wear rings may be withdrawn over the rolling elements.

2. A bearing assembly according to claim 1 wherein there are two backing elements—a first backing element that supports the first wear ring and a second backing element that supports the second wear ring—and the backing elements bias the wear rings together.

3. A bearing according to claim 2 wherein the backing element for each wear ring includes a base, a floating segment attached to the wear ring, and a connecting segment that extends between the base and the floating segment at an angle oblique to both; and wherein the base of the first backing element is attached to the extension.

4. A bearing assembly according to claim 3 and further comprising a can mounted on the inner race and extending outwardly away from the axis; and wherein the base of the second backing element is attached to the can.

5. A bearing assembly according to claim 1 wherein a tapered surface is presented generally inwardly toward the axis and surrounds one of the wear rings; wherein said one wear ring has a tapered rear surface that is presented toward the tapered surface that surrounds the wear ring; and wherein said one backing element is an elastomeric O-ring that is located between the tapered rear surface on said one wear ring and the tapered surface that surrounds that wear ring.

6. A bearing assembly according to claim 1 and further comprising a can mounted on the inner race and extending outwardly away from the axis; and wherein said one backing element is located between the can and the second wear ring.

7. A bearing assembly according to claim 6 wherein said one backing element is a membrane located between the second wear ring and the can.

8. A bearing assembly according to claim 7 and further comprising at least one spring located between the can and the second wear ring and biasing the second wear ring toward the first wear ring.

9. An assembly according to claim 1 wherein the extension is formed integral with the outer race.

10. An assembly according to claim 1 wherein the extension is welded to the outer race.

11. An assembly for accommodating rotation about an axis, said assembly comprising:
 a first member;
 a second member;
 a bearing located between the first and second members and having an inner race fitted to the second member and provided with a raceway that is presented away from the axis, an outer race that is fitted to the first member and is provided with a raceway that is presented toward the axis and the raceway of the inner race and also an extension that is located axially beyond its raceway, and rolling elements located between and contacting the raceways of the inner and outer races;
 a seal for isolating the interior of the bearing from external contaminants and including a first wear ring carried by the extension of the outer race, a second wear ring supported by the second member and contacting the first wear ring, at least one backing element urging the wear rings together to maintain a dynamic fluid barrier at the contacting wear surfaces, the seal being larger than the envelope formed by the rolling elements around the inner race.

12. An assembly according to claim 11 wherein the second wear ring is carried by the second member.

13. An assembly according to claim 11 and further comprising a can attached to the inner race that is on the second member, and the second wear ring is carried by the can.

14. An assembly according to claim 13 wherein the inner race has a rib that projects outwardly beyond the raceway for the inner race, and the can is mounted on and attached to the rib.

15. An assembly according to claim 11 wherein the extension on the outer race has a tapered surface; wherein the first wear ring has a tapered rear surface that is presented toward the tapered surface on the extension; and wherein the first backing element is an elastomeric O-ring that is between and bears against the tapered surface on the extension and tapered rear surface on the first wear ring.

16. An assembly according to claim 15 wherein the second member has a tapered surface; wherein the second wear ring has a tapered rear surface which is presented toward a tapered surface on the second member; and wherein the seal further comprises another elastomeric O-ring located between the tapered rear surface on the second wear ring and the tapered surface on the second member.

17. An assembly according to claim 15 and further comprising a can attached to the inner race, the can having a tapered surface that is presented generally toward the axis; wherein the second wear ring has a tapered rear surface that is presented toward the tapered surface on the can; and wherein another O-ring is located between and contacts the tapered surface on the can and the tapered rear surface on the second wear ring.

18. An assembly according to claim 11 wherein the backing element is formed from a polymer and includes a base, a floating segment spaced from the base and attached to the wear ring, and a connecting segment extending between and connected to the base and floating segment, the connecting segment including at least one convolution located at an oblique angle with respect to the axis.

19. An assembly according to claim 11 wherein each wear ring is urged toward the other wear ring by a backing element, with each backing element including a base attached to a supporting structure, a floating segment spaced from the base and attached to the wear ring for the backing element, and a connecting segment located between and connected to the base and floating segment, the connecting segment including at least one convolution located at an oblique angle to the axis.

20. A bearing assembly according to claim 11 and further comprising a flexible membrane attached to the second wear ring to support it ultimately from the second member.

* * * * *